US011916346B2

(12) United States Patent
De Cloet

(10) Patent No.: US 11,916,346 B2
(45) Date of Patent: Feb. 27, 2024

(54) METHOD OF CRIMPING AN ELECTRICAL HF CONNECTION DEVICE

(71) Applicant: TE Connectivity Germany GmbH, Bensheim (DE)

(72) Inventor: Olivier De Cloet, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 58 days.

(21) Appl. No.: 17/383,925

(22) Filed: Jul. 23, 2021

(65) Prior Publication Data

US 2022/0029371 A1 Jan. 27, 2022

(30) Foreign Application Priority Data

Jul. 24, 2020 (DE) ......................... 102020119624.5

(51) Int. Cl.
*H01R 43/05* (2006.01)
*H01R 9/05* (2006.01)

(52) U.S. Cl.
CPC ........... *H01R 43/05* (2013.01); *H01R 9/0518* (2013.01)

(58) Field of Classification Search
CPC .. H01R 9/0518; H01R 43/05; H01R 13/6473; H01R 2103/00; H01R 43/0488
See application file for complete search history.

(56) References Cited

U.S. PATENT DOCUMENTS 3,711,942 A 1/1973 Reynolds
5,273,458 A 12/1993 Fisher, Jr. et al.
5,490,801 A 2/1996 Fischer, Jr. et al.
6,808,417 B2 * 10/2004 Yoshida ............ H01R 13/6473 439/585
8,011,954 B2 * 9/2011 Nagafuchi ........... H01R 9/0518 439/585
9,787,031 B2 * 10/2017 Ludwig .................. H01R 43/04

(Continued)

FOREIGN PATENT DOCUMENTS

DE 69316328 T2 5/1998
DE 102018104253 A1 8/2019

(Continued)

OTHER PUBLICATIONS

Extended European Search Report, Application No. 21187451.6-1201, dated Mar. 23, 2022, 11 pages.

(Continued)

*Primary Examiner* — Minh N Trinh
(74) *Attorney, Agent, or Firm* — Barley Snyder

(57) ABSTRACT

A method for crimp mounting a high-frequency (HF) electrical crimp connecting device to an electrical cable includes the steps of crimping a ferrule into a mounting state wherein its maximum diameter is fixed, and arranging the ferrule in its mounting state over an exposed shielding conductor of the cable. A terminal is crimped onto an inner conductor of the cable, and a shielding contact sleeve is placed over the cable and crimped, at least in the area of the ferrule. A target impedance or impedance range of the resulting cable is set according to at least one of a dimension of at least one crimping tool used to perform the crimping steps, or at least one dimension of at least one of the resulting crimps performed by the at least one crimping tool.

17 Claims, 6 Drawing Sheets

(56) References Cited

U.S. PATENT DOCUMENTS

| | | | | |
|---|---|---|---|---|
| 2008/0254675 | A1 * | 10/2008 | Lee | H01B 11/1808 439/578 |
| 2010/0035449 | A1 * | 2/2010 | Nagafuchi | H01R 4/18 439/98 |
| 2012/0202372 | A1 | 8/2012 | Hardy et al. | |
| 2016/0134032 | A1 | 5/2016 | Hall et al. | |
| 2019/0267727 | A1 | 8/2019 | Zebhauser et al. | |
| 2022/0029371 | A1 * | 1/2022 | De Cloet | H01R 43/0488 |

FOREIGN PATENT DOCUMENTS

| | | | |
|---|---|---|---|
| EP | 1291981 | A2 | 9/2002 |
| EP | 1291981 | A3 | 9/2002 |
| EP | 1592098 | A2 | 4/2005 |
| EP | 1592098 | A3 | 4/2005 |
| EP | 3726667 | A1 | 10/2020 |
| JP | 2017534154 | | 11/2017 |
| WO | 2008146645 | A1 | 12/2008 |
| WO | 2014/074283 | A1 * | 5/2014 |
| WO | 2019063641 | A1 | 4/2019 |

OTHER PUBLICATIONS

Office Action from the Deutsches Patent—und Markenamt dated Nov. 11, 2022, corresponding to Application No. 10 2020 119 624.5, 5 pages.

Office Action from the Japanese Patent Office dated Feb. 21, 2023, corresponding to Application No. 2021-118682 with English translation, 7 pages.

* cited by examiner

METHOD OF CRIMPING AN ELECTRICAL HF CONNECTION DEVICE

CROSS-REFERENCE TO RELATED APPLICATIONS

This application claims the benefit 35 U.S.C. § 119 of German Patent Application No. 102020119624.5 filed on Jul. 24, 2020, the entire disclosure of which is incorporated herein by reference.

FIELD OF THE INVENTION

The invention relates to a method for crimp mounting an electrical HF-crimp connecting device onto an electrical cable selectable from at least two different cable types.

BACKGROUND

Modern electrical connectors must ensure faultless transmission of electricity and electrical signals in today's high-demand applications. As a result, efforts are continually being made to improve the performance, reliability and efficiency of these connectors, as well as to lower their cost. High frequency (HF) data connectors (i.e., connectors used in applications with transmission frequencies greater than 3 MHz) pose unique challenges, as each component of the connector can significantly influence connector performance as a result of the wave properties of electricity. In the case of electrical HF-plug-in connections, maintaining signal integrity is proving to be a significant obstacle. More specifically, signal integrity in these connections must be ensured by at least sufficient impedance properties of the HF-connecting device in interaction with a partly-complementing HF-connecting device. As the impedance along a signal path in the HF-connecting device changes depending on changes in geometry and cross-section, in order to obtain the desired impedances over a length of the HF-connecting device, the HF-connecting device must be formed in a predetermined manner associated with the desired impedance.

By way of example, a ferrule or supporting sleeve of an HF connector has a significant influence on an impedance of the final connector or connector assembly. Conventional ferrules of a given type are only intended for use with a single type of cable, for example with a cable from the same manufacturer, or a cable of a particular size (e.g., the diameter of its inner layers). For other cable types or cable sizes, other types of ferrules must be used. Further, the diameter of a given cable can vary undesirably during a cable connectorization process. This change in diameter may be a result of at least one mechanical property of the cable (e.g., finish, hardness, compressibility, elasticity), and in particular of its inner insulating layer(s). Similar problems occur as cables of the same diameter from different manufacturers often have different mechanical properties, and cables from a given manufacturer can have varying dimensional tolerances. As a result of each of these conditions, manufacturing is made more difficult as a variety of ferrules need to be accessible for accommodating varying cable characteristics. Moreover, in the case of cables with changing diameters and/or varying tolerances, an ideal fit is often not achievable even with a variety of ferrules available.

It is therefore an object of the present disclosure to provide an improved method for crimp mounting an electrical HF-crimp connecting device on an electrical cable in order to achieve a desired impedance characteristic of the resulting cable or assembly.

SUMMARY

According to an embodiment of the present disclosure, a method for crimp mounting a high-frequency (HF) electrical crimp connecting device to an electrical cable with a resulting target impedance or impedance range is provided. The method includes the steps of crimping a ferrule into a mounting state wherein its maximum diameter is fixed, and arranging the ferrule in its mounting state over an exposed shielding conductor of the cable. A terminal is crimped onto an inner conductor of the cable, and a shielding contact sleeve is placed over the cable and crimped thereto at least in the area of the ferrule. A target impedance or impedance range of the resulting cable is set as a result of at least one of a dimension of at least one crimping tool used to perform the crimping steps, or at least one dimension of at least one of the resulting crimps performed by the at least one crimping tool.

BRIEF DESCRIPTION OF THE DRAWINGS

The invention will now be described by way of example with reference to the accompanying Figures, of which.

DETAILED DESCRIPTION OF THE EMBODIMENTS

Figure 1:
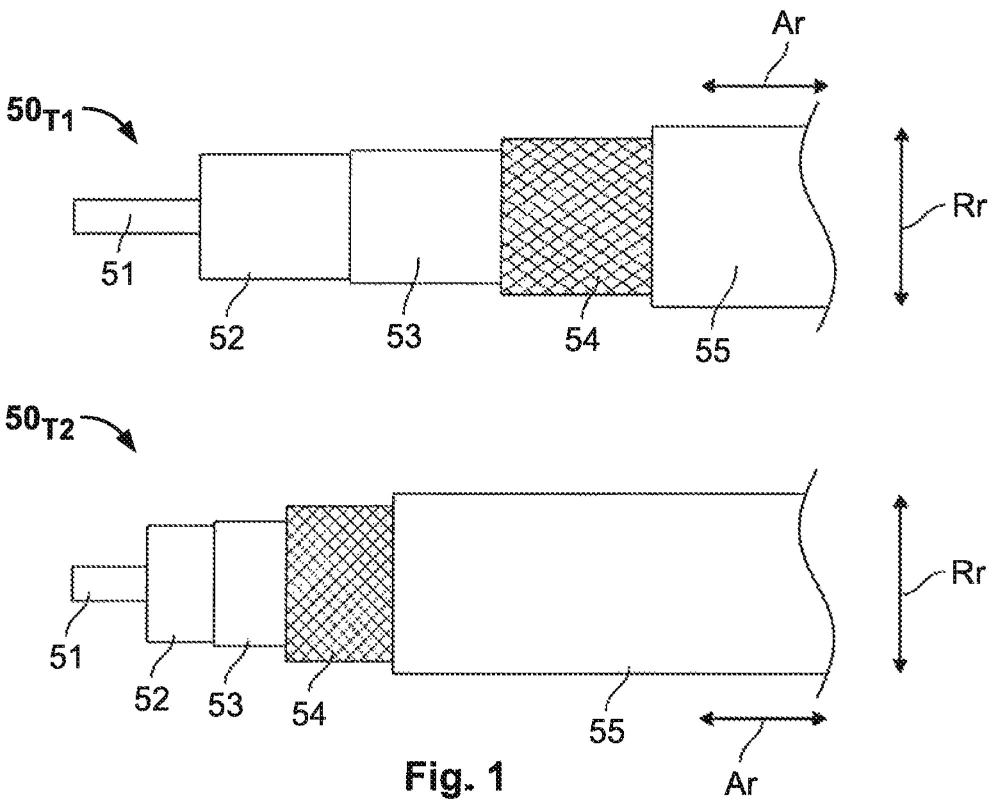
FIG. 1 show side views of two longitudinal end portions of two specific types of HF-coaxial cables that have been pulled off in stages.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a method for the universal crimp mounting of an electrical HF-crimp connecting device onto a type of electrical cable selectable from at least two distinct cable types is provided. A crimping dimension of a crimping tool for performing the crimp mounting is chosen according to a selected type of cable in such a way that, for a mounting state of the connecting device on the selected type of cable, an impedance of the at least partially pre-assembled cable is substantially set in a target range.

In addition to the properties of the type of connecting device and the properties of the chosen type of cable, the crimping dimension correlates with a shape of a crimping cross-section of the connecting device, and also with crimping diameters (ellipse, circle), crimping radiuses (ellipse), crimping portions, crimping regions, and the like. The connecting device may be formed as a contact means, or a contact device. The connecting device may comprise a plurality of parts, for example three parts as a coaxial connecting device, or four parts as a twinaxial connecting device having two terminals. Furthermore, the at least two types of cables may be formed as at least two types from single or multi-core cables, coaxial cables, twinaxial cables, triaxial cables, or data transmission lines, by way of example only.

The invention is explained more specifically below on the basis of exemplary embodiments respectively of an embodiment of a variant of a method for universal crimp mounting of a same type of an electrical HF-crimp connecting device 1 on a type of electrical cables selectable from at least two types. Although the invention is more specifically described and illustrated in more detail by preferred exemplary embodiments, the invention is not restricted by the exemplary embodiments disclosed.

FIG. 1 shows two pulled-off longitudinal end portions of two specific types $\mathbf{50}_{T1}$, $\mathbf{50}_{T2}$ (T1 for cable type 1, T2 for cable type 2) of modern HF-coaxial cables $\mathbf{50}_{Tn}$. Both cables $\mathbf{50}_{Tn}$ comprise, from the inside outwards, an inner conductor 51, a dielectric 52, a shield 53, 54 and a protective sheath 55. The shield 53, 54 is divided into a shielding film 53 and a shielding conductor 54 provided thereon. In the case of other types $\mathbf{50}_{T3}$ of cables $\mathbf{50}_{Tn}$, the shielding film 53 may be omitted. According to cable type $\mathbf{50}_{T1}$, $\mathbf{50}_{T2}$, $\mathbf{50}_{T3}$, . . . , the cables $\mathbf{50}_{Tn}$ have different properties, which must be taken into account during the assembly of the cable types $\mathbf{50}_{T1}$, $\mathbf{50}_{T2}$, $\mathbf{50}_{T3}$, . . . with a plurality of types of HF-crimp coaxial connecting devices and in particular a same type of HF-crimp coaxial connecting devices 1, in order not to significantly impair the signal integrity of the pre-assembled cable 50 created thereby.

According to an embodiment of a method for crimp mounting of a type of a connecting device 1 on a type of electrical cables $\mathbf{50}_{Tn}$; $\mathbf{50}_{T1}$, $\mathbf{50}_{T2}$, $\mathbf{50}_{T3}$, . . . selectable from at least two types, in a first step (see FIGS. 1 and 8), an electrical HF-crimp ferrule 20 is crimped on a shielding conductor 54 of the selected type of cable $\mathbf{50}_{T1}$/$\mathbf{50}_{T2}$/$\mathbf{50}_{T3}$/ . . . (first crimping step I of the connecting device 1). Possible embodiments of the ferrule 20 are represented in FIGS. 3-6. In order for the connecting device 1 to be crimped onto a number of differing types of cables $\mathbf{50}_{Tn}$; $\mathbf{50}_{T1}$, $\mathbf{50}_{T2}$, $\mathbf{50}_{T3}$, . . . , the ferrule 20 is formed in such a way that, starting from its initial form in a mounting state $M_{20}$ on the selected type of cable $\mathbf{50}_{T1}$/$\mathbf{50}_{T2}$/$\mathbf{50}_{T3}$/ . . . , it can be radially compressed or reduced to a compressed mounting state $M_1$.

Figure 10:
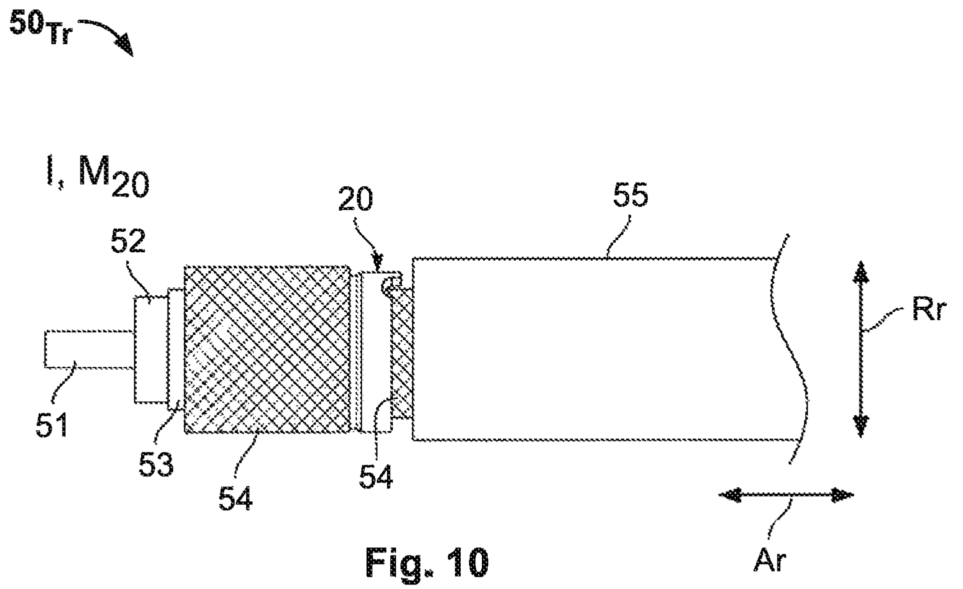
FIG. 10 is a side view of another step of the method according to the invention.
Figure 11:
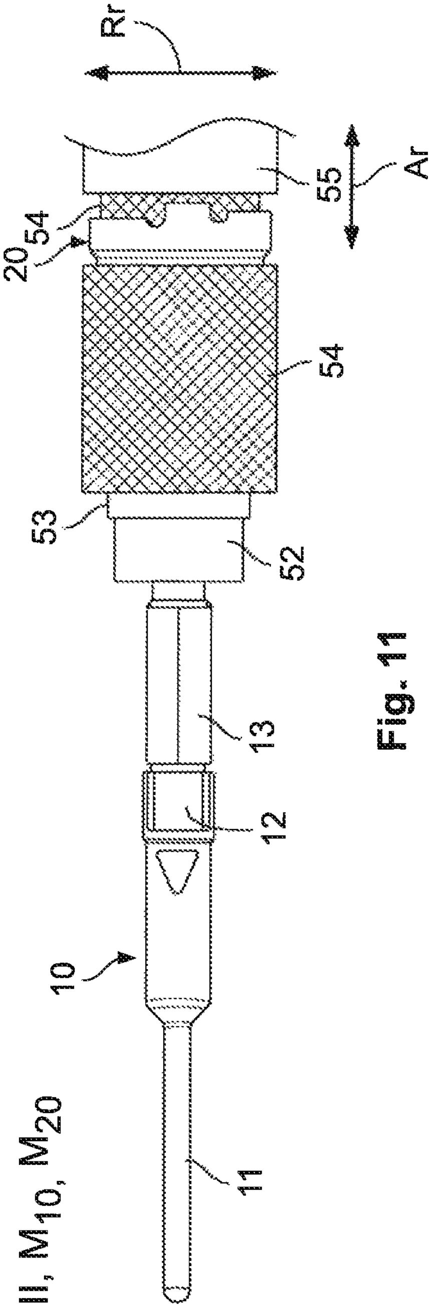
FIG. 11 is a side view of another step of the method according to the invention.
Figure 12:
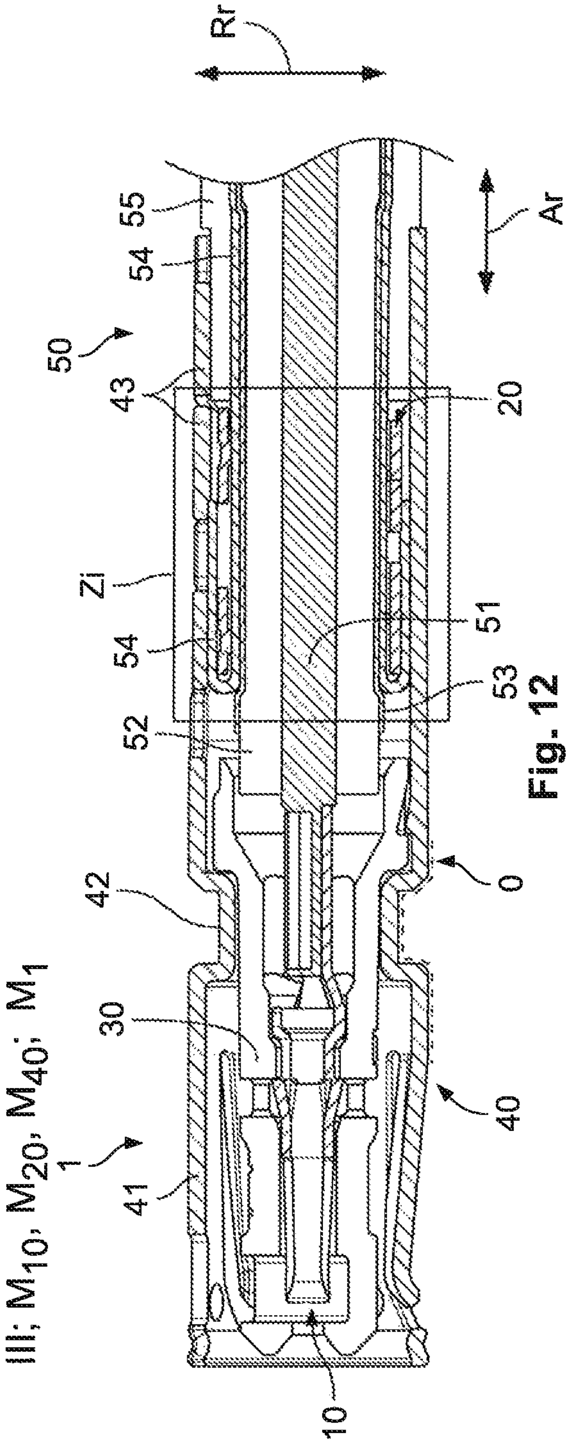
FIG. 12 is a side sectional view of another step of the method according to the invention.

In a second step, following the first step (see FIGS. 9-11), an inner electrical HF-crimp terminal 10 is crimped onto an inner conductor 51 of the selected type of cable $\mathbf{50}_{T1}$/$\mathbf{50}_{T2}$/$\mathbf{50}_{T3}$/ . . . (second crimping step II of the connecting device 1). In a third step, following the second step (see FIG. 12), an outer electrical HF-crimp terminal 40, in particular an HF-crimp shielding contact sleeve 40, is crimped over the ferrule 20 and onto the protective sheath 55 of the selected type of cable $\mathbf{50}_{T1}$/$\mathbf{50}_{T2}$/$\mathbf{50}_{T3}$/ . . . (third crimping step III of the connecting device 1, mounting state $M_1$ of the connecting device 1). Because of its design, the ferrule 20 is able to be compressed or reduced in its diameter during the third crimping step.

Figure 2:
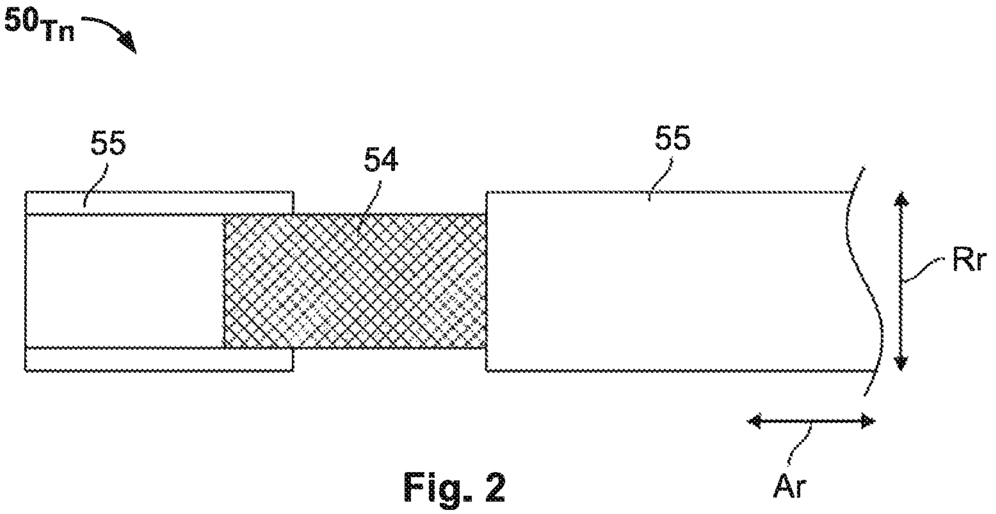
FIG. 2 is a side view of a first substep of a method according to the invention for crimp mounting of HF-crimp coaxial connecting devices at or on a type of coaxial cables selectable from at least two types.

Referring to FIG. 2, according to embodiments, a first step of a pre-assembly process includes at least the partial pulling off of the protective sheath 55 of the corresponding cable $\mathbf{50}_{Tn}$, $\mathbf{50}_{T1}$/$\mathbf{50}_{T2}$/$\mathbf{50}_{T3}$/ . . . , wherein its shielding conductor 54 is exposed. After, the ferrule 20 is crimped onto this free longitudinal portion (first crimping step I), wherein the ferrule 20 is deformed substantially only elastically, partially plastically, and/or substantially plastically. As shown in FIGS. 3-7, the ferrule 20 comprises a circumferential center portion 23 and two circumferential flanks 21, 22 with in each case a free circumferential end.

Figure 4:
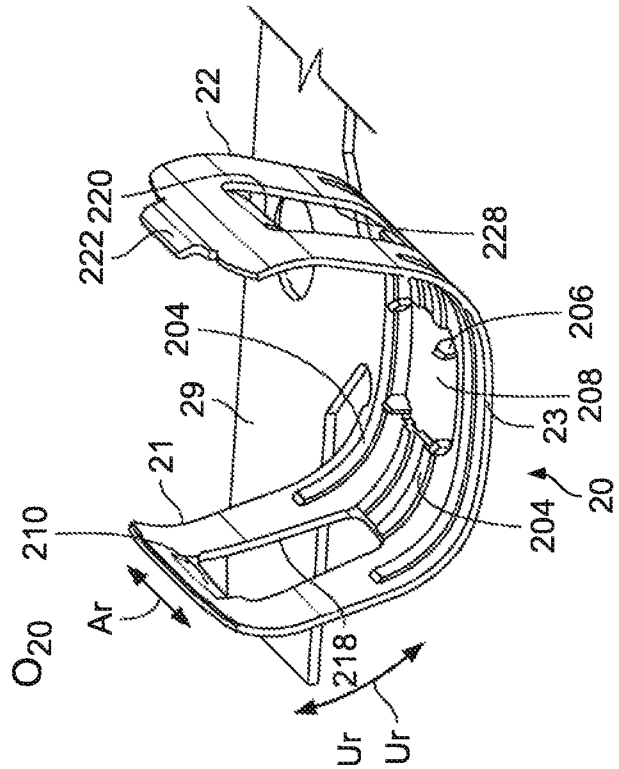
FIG. 4 is a perspective view of an HF-crimp ferrule according to the invention that is variable in its mounting diameter.
Figure 3:
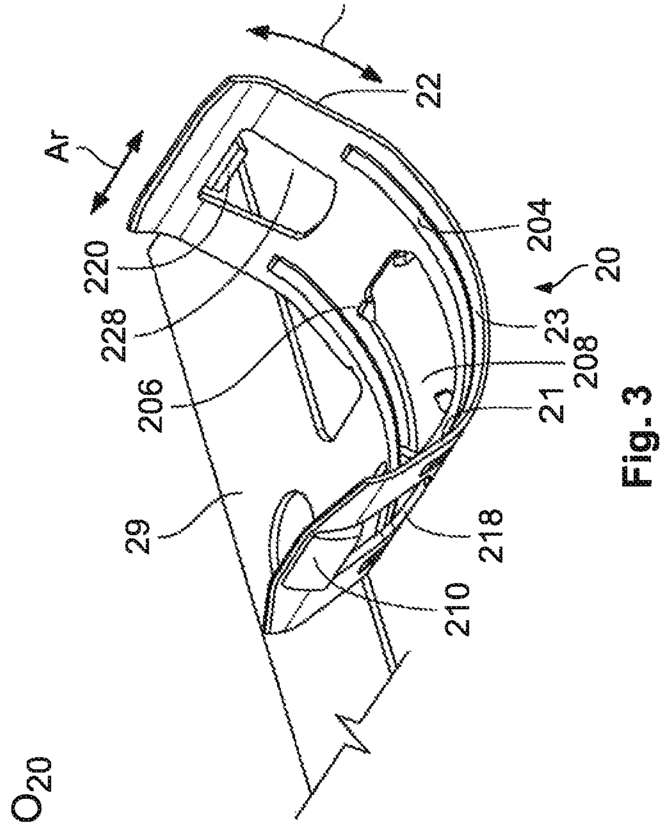
FIG. 3 is a perspective view of an HF-crimp ferrule according to the invention that is variable in its mounting diameter.
Figure 6:
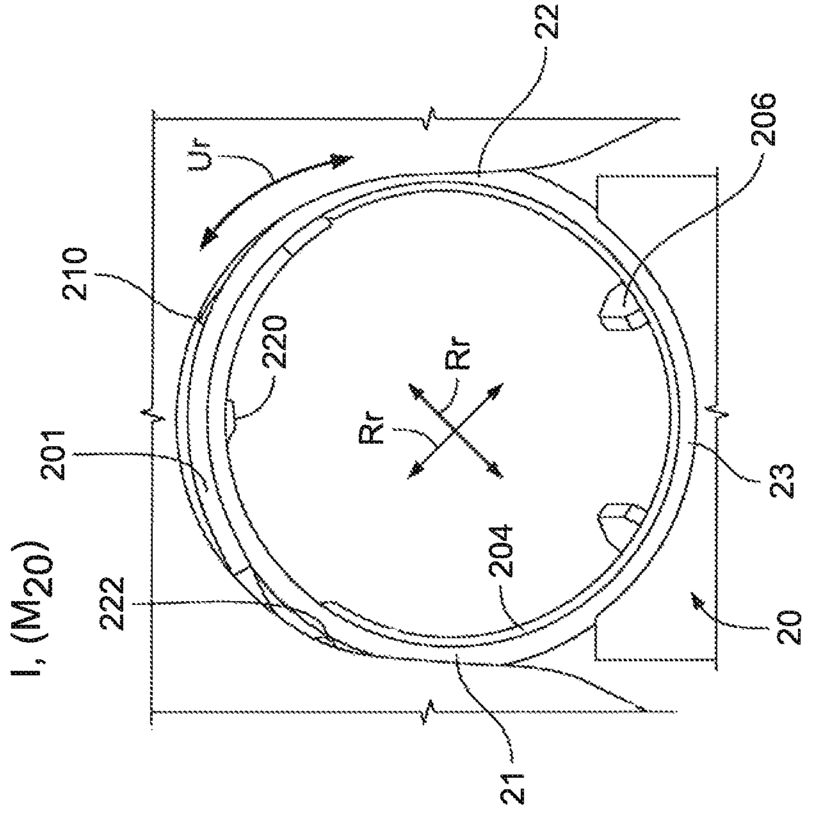
FIG. 6 is a front view of an HF-crimp ferrule according to the invention that is variable in its mounting diameter.

Referring to FIGS. 3 and 4, starting from its open state $O_{20}$, the two circumferential flanks 21, 22 of the ferrule 20 can be bent towards one another, wherein a self-locking 200 of or between the two circumferential flanks 21, 22 is established during the crimping for their mounting state $O_{20}$. The ferrule 20 is formed and mounted on the cable $\mathbf{50}_{Tn}$, $\mathbf{50}_{T1}$/$\mathbf{50}_{T2}$/$\mathbf{50}_{T3}$/ . . . in such a way that an intrinsic freewheel 201 is established in the ferrule 20, wherein, starting from the set-up self-locking 200, the circumferential flanks 21, 22 can be displaced with respect to one another in preferably at first only one circumferential direction Ur.

The circumferential flanks 21, 22 may include respective latching means 210, 220 for achieving the self-locking 200 of the ferrule 20, wherein the self-locking is established in the mounting state $M_{20}$ of the ferrule 20. Further, the latching means 210, 220 may only be effective against an increase in the mounting diameter of the ferrule 20 while allowing for a reduction of the mounting diameter of the ferrule 20. In this way, the latching means 210, 220 constitute a means of stopping a mutual displaceability of the circumferential flanks 21, 22 in the circumferential direction Ur such that a displaceability of the circumferential flanks 21, 22 in the direction of a reduction of the mounting diameter of the ferrule 20 is still possible.

The latching means 210 of a first circumferential flank 21 may be formed as a radial outer hook 210 and the latching means 220 of a second circumferential flank 22 may be formed as a radial inner hook 220. In this way, the outer hook 210 is formed as a latching hook 210 extending radially outwards from the first circumferential flank 21 and the inner hook 220 is formed as a latching hook 220 extending radially inwards from the second circumferential flank 22. During the initial transfer of the ferrule 20 from its mounting state $M_{20}$ into its compressed mounting state ($M_1$), the latching means 210, 220 are released from one another. The compressed mounting state ($M_1$) of the ferrule 20 can be achieved, for example, as the shielding contact sleeve 40 is crimped over the ferrule 20.

Figure 5:
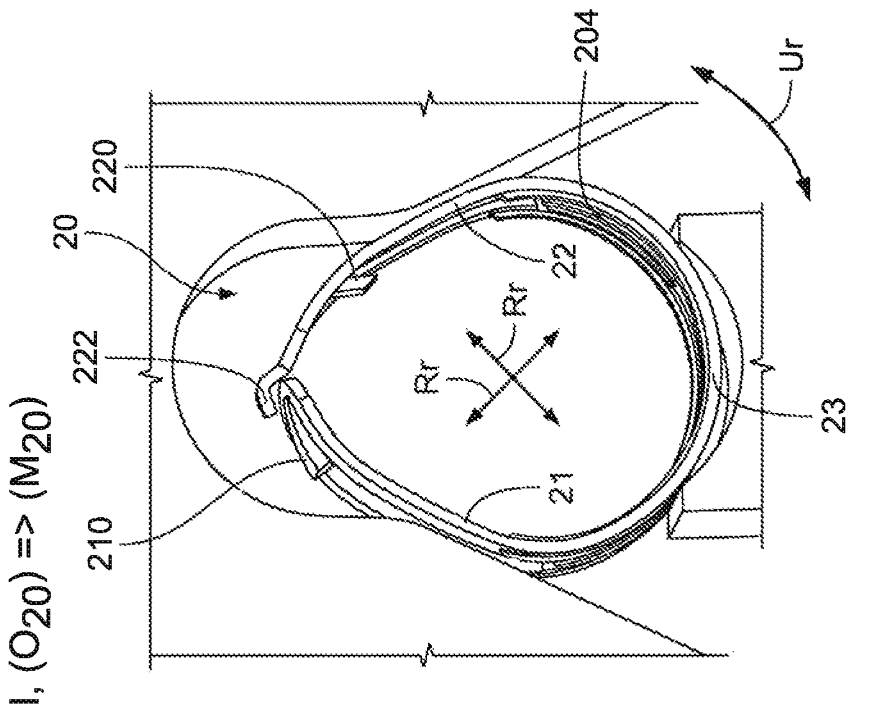
FIG. 5 is a perspective view of an HF-crimp ferrule according to the invention that is variable in its mounting diameter.

The ferrule 20 may have a singular impedance compensating means 208 and/or at least one stiffening bead 204 in its circumferential center portion 23. The ferrule 20 may also have a singular impedance compensating means 218, 228 and/or at least one stiffening bead 204 in both its circumferential flanks 21, 22. In the circumferential center portion 23, at least one fixing hook 206 that protrudes inwards in the radial direction Rr may be formed by the ferrule 20. In one embodiment, a plurality of fixing hooks (two or four) may be provided in corner regions of the impedance compensating means 208 of the circumferential center portion 23. The fixing hooks 206 may also be omitted, as shown in FIG. 5.

An edge of the impedance compensating means 218 of the first circumferential flank may be formed as the latching means 210 of the first circumferential flank 21. The latching means 210 of the first circumferential flank 21 may be formed as a circumferential lug which extends radially outwards from a curved plane of the first circumferential flank, and possibly has a tangential part. An edge of the impedance compensating means 228 of the second circumferential flank 22 may be formed as the latching means 220 of the second circumferential flank. The latching means 220 of the second circumferential flank 22 may also be formed as a radial hook which extends radially inwards from a curved plane of the second circumferential flank and possibly has a tangential part.

In an open state of the ferrule 20, the circumferential center portion 23 may have a smaller radius of curvature than a circumferential portion of the circumferential flanks 21, 22 directly adjoining in a circumferential direction. As a result, the ferrule 20 has a cross-section that is pot-shaped or u-shaped with a comparatively straight or comparatively (with respect to the directly adjoining circumferential portion of the circumferential flank) less curved crosspiece (center portion) between its two legs. In other embodiments, the ferrule 20 may be formed in a cross-section or a front view in the form of an arc of a circle, or in the form of an arc of an ellipse. An arc ring portion of an oval can likewise be used. The circumferential flanks 21, 22 may be formed as substantially rectilinear or slightly inwardly curved in their flank circumferential center portions. Thus, a flank circumferential center portion is arranged substantially tangentially with respect to a circumferential portion directly adjoining in the direction of the circumferential center portion in the circumferential direction.

The stiffening bead 204 may be established in an axial end portion or in both axial end portions. In one embodiment, a corresponding stiffening bead 204 extends from one circumferential flank 21, 22 over the circumferential center portion 23 and past the impedance compensating means 208 of the circumferential center portion into the other circumferential flank, wherein the two longitudinal ends of the stiffening bead lie within the circumferential flanks. In particular, it is preferred that the ferrule 20 is formed such that one circumferential end of such a stiffening bead in a compressed or pressed-together mounting state of the ferrule does not come into mechanical contact with a corresponding circumferential end of a circumferential flank, resulting in discontinuous diameter reduction.

Further, a circumferential transitional region from the circumferential center portion 23 into a circumferential flank 21, 22 may have a stiffening bead 204 axially level with the impedance compensating means 208, and in particular between the impedance compensating means of the circumferential center portion and a corresponding impedance compensating means 218, 228 of the circumferential flank. At least one, in particular two or a plurality of such stiffening beads 204 may be formed in the circumferential transitional region, in particular symmetrically with respect to an axially central circumferential center line. Such a stiffening bead 204 may begin on or in an impedance compensating means and extend onto or into the impedance compensating means directly adjacent to it in the circumferential direction. Apart from an open interior space of the ferrule 20, two impedance compensating means that are directly adjacent in the circumferential direction may be in fluid communication by way of at least one stiffening bead.

The ferrule 20 may further comprise an anti-collision lug 222 projecting away outwards on one circumferential flank 22 for preventing the free circumferential ends of the circumferential flanks 21, 22 from colliding with one another during the crimping of the ferrule 20 (see FIGS. 4 and 5). The anti-collision lug 222 may be formed in the axial direction Ar as a comparatively narrow (FIG. 5) or a comparatively wide (FIG. 4) anti-collision lug 222, which may be advantageous depending on a design of the ferrule 20 and/or a crimping process to be used. It one embodiment, the anti-collision lug 222 is formed on the circumferential flank 22 (second circumferential flank 22) on which the inwardly directed latching means 220 is also formed.

In the open state $O_{20}$ of the ferrule 20, the anti-collision lug 222 extends from a circumferential end of the circumferential flank 22 in the circumferential direction Ur and possibly in the radial direction Rr. In the open state $O_{20}$, the anti-collision lug 222 extends at first substantially outwards in the radial direction Rr and following that substantially in the circumferential direction Ur. In the mounting state $M_{20}$ of the ferrule 20, the anti-collision lug 222 extends in the opposite way, specifically at first substantially in the circumferential direction Ur and following that substantially inwards in the radial direction Rr. The radial portion of the anti-collision lug 222 comes to lie in the circumferential direction Ur, wherein the circumferential portion of the anti-collision lug 222 is bent over radially inwards. Other configurations of the anti-collision lug 222, such as for example a ramp for a sliding over or under and through of the one circumferential flank over/under the other, etc., can also be used.

During the crimping of the ferrule 20 (FIG. 5), the anti-collision lug 222 is actuated or triggered by a crimping tool, in particular a crimp indentor, in such a way that the anti-collision lug 222 presses the first circumferential flank 21 radially under the second circumferential flank 22. As a result, a beginning freewheel 201 of the ferrule 20 in the circumferential direction Ur, and the self-locking 200 of the ferrule 20, can be set or initiated. It is preferred that the crimping process works in such a way, and/or the anti-collision lug 222 is formed in such a way, that in the mounting state $M_{20}$ of the ferrule 20 the anti-collision lug 222 has been positioned into a corresponding impedance compensating means 218.

Figure 8:
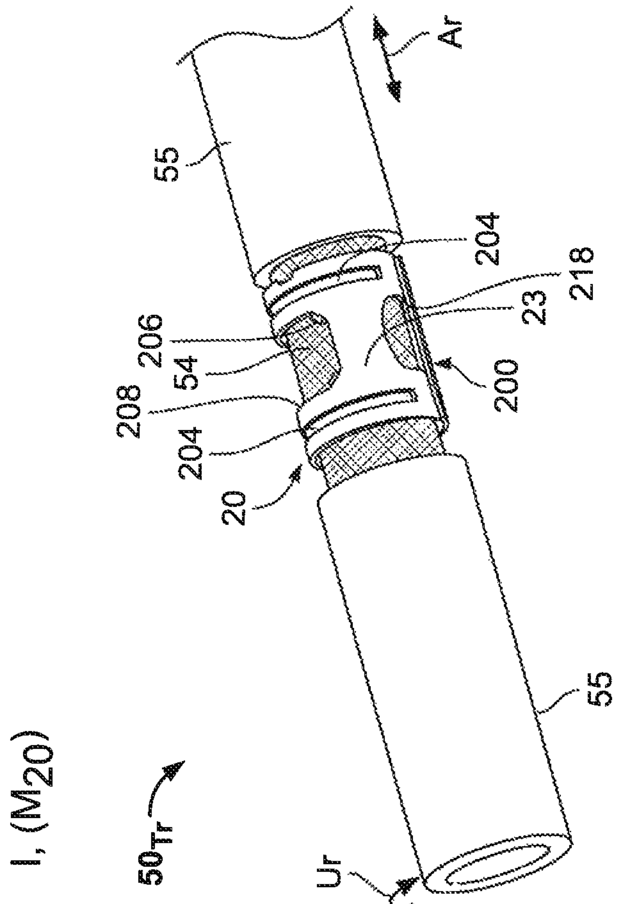
FIG. 8 is a perspective view of a step of a crimping method according to the invention.
Figure 7:
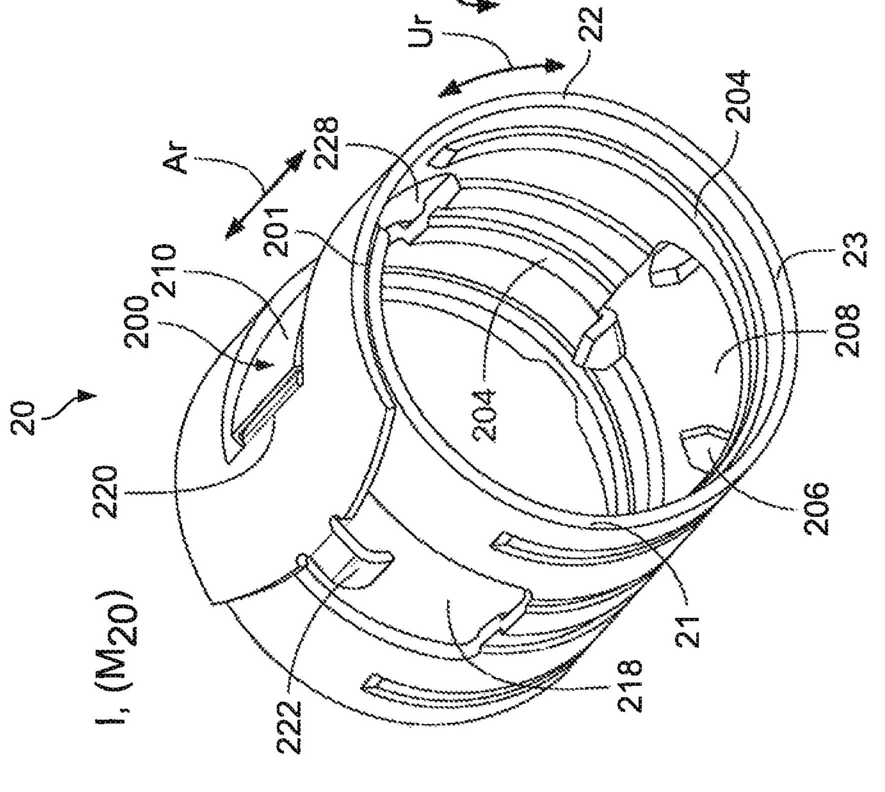
FIG. 7 is a perspective view of an HF-crimp ferrule according to the invention that is variable in its mounting diameter.
Figure 9:
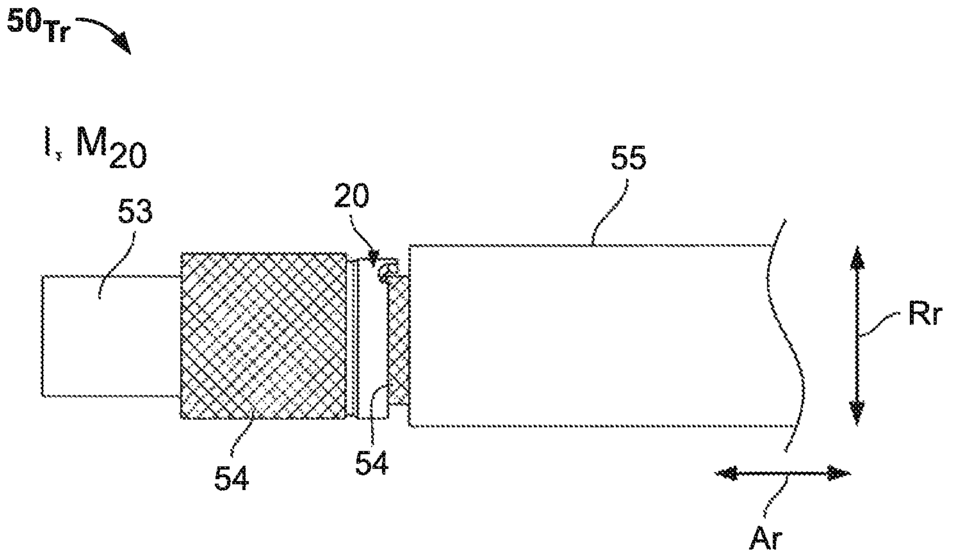
FIG. 9 is a perspective view of another step of the method according to the invention.

Referring to FIGS. 8 and 9, after the crimping of the ferrule 20, the partially pulled-off longitudinal end portion of the protective sheath 55 is removed completely. Subsequently, the axial portion of the shielding conductor 54 protruding under the ferrule 20 in the direction of a free longitudinal end, preferably without shielding film 53, is bent over onto the ferrule 20. A remaining free longitudinal end portion of the cable $\mathbf{50}_{Tn}$, $\mathbf{50}_{T1}$/$\mathbf{50}_{T2}$/$\mathbf{50}_{T3}$/ . . . (FIG. 2)

is then prepared for the crimping of the inner terminal 10. Next, the inner terminal 10 (electromechanical contact portion 11, mechanical fastening portion 12 and electromechanical crimping portion 13) is crimped onto the cable $\mathbf{50}_{Tn}$, $\mathbf{50}_{T1}/\mathbf{50}_{T2}/\mathbf{50}_{T3}/\ldots$ (second crimping step II, FIG. 11).

Finally, the shielding contact sleeve 40 (electromechanical contact portion 41, mechanical fastening portion 42 and electromechanical crimping portion 43) may be crimped over the ferrule 20, and further, onto the protective sheath 55 (third crimping step III). An impedance Im of the at least partially pre-assembled cable 50 is substantially set in a target corridor Zi within its connecting device 1 by the chosen crimping dimension of a mounting state $M_{40}$ ($=M_1$) of the shielding contact sleeve 40 at/on the selected type of cable $\mathbf{50}_{Tn}$, $\mathbf{50}_{T1}/\mathbf{50}_{T2}/\mathbf{50}_{T3}/\ldots$. This takes place, for example, on the basis of the above specimen cables, wherein the crimping dimension (e.g., crimping height) that correlates with a desired impedance Im is selected.

The target corridor may be characterized by a minimum, average and/or maximum impedance and/or by a substantially critical portion of the connecting device. In the case of a 50Ω coaxial cable, a minimum or average impedance for the pre-assembled cable in the region of its connecting device may be for example about: 44Ω, 45Ω, 46Ω, 47Ω, 48Ω or 49Ω. Other cable impedances, such as for example 75Ω, 93Ω to 125Ω etc. can of course be used. Here, the impedance may have a tolerance of ±0.05Ω; ±0.1Ω; ±0.15Ω; ±0.2Ω; ±0.25Ω; ±0.3Ω; ±0.4Ω; ±0.5Ω; ±0.75Ω, ±1Ω or ±1.5Ω Other impedances, such as for example 75 ohms, 93-125 ohms etc., can also be used.

During the overcrimping step of the ferrule 20 by means of the shielding contact sleeve 40, the self-locking 200 of the ferrule 20 is released of its own accord and the circumferential flanks 21, 22 can slide past each other in the intrinsic freewheel 201. The ferrule 20 moves radially under the shielding contact sleeve 40 from its mounting state $M_{20}$ into its compressed mounting state ($M_1$). A mounting diameter of the ferrule 20 on the cable $\mathbf{50}_{T1}/\mathbf{50}_{T2}/\mathbf{50}_{T3}/\ldots$ is thereby reduced to a compressed mounting diameter. The turned-over longitudinal end portion of the shielding conductor may in this case be pressed radially outwards by the ferrule and/or a compressed longitudinal portion of the cable and be retained radially outwards by the shielding contact sleeve. As a result, good electrical contact of the shielding conductor with the shielding contact sleeve is ensured.

The ferrule 20 may be formed in such a way that the self-locking of the ferrule 20 can be established or is established by means of the anti-collision lug 222 and with a corresponding means of the ferrule 20, for example a means that partly complements it. The anti-collision lug 222 may be formed in such a way that it is locked in the mounting state $M_{20}$ and/or compressed mounting state ($M_1$), for example for larger cable diameters, with a latching means of the circumferential flank 21, the latching means 210 or on/in the impedance compensating means 218. In particular, in such embodiments, the anti-collision lug 222 may be locked with the flank 21 in the compressed mounting state ($M_1$).

Embodiments of the present disclosure further include a crimping method of an outer ferrule 20 (as distinct from an inner ferrule 20 described above). In a first preparation step, the cable $\mathbf{50}_{T1}/\mathbf{50}_{T2}/\mathbf{50}_{T3}/\ldots$ is freed of its insulation in stages at its longitudinal end portion, preferably completely. In a first crimping step of the method, the inner terminal 10 is crimped on. Afterward, the shielding conductor 54 is splayed open and the shielding contact sleeve 40 is fitted thereunder, wherein the shielding contact sleeve 40 is mounted with a somewhat wider crimping slit that still has to be further closed in a later step. Subsequently, the ferrule 20 is crimped onto the shielding conductor 54 and the shielding contact sleeve 40, wherein an impedance of the created, at least partially pre-assembled cable $\mathbf{50}_{T1}/\mathbf{50}_{T2}/\mathbf{50}_{T3}/\ldots$ is substantially set in a target corridor Zi.

As used throughout the above-description, a cable type is defined as a specific, single or same type having substantially the same or identical properties (e.g., construction, diameters, radiuses, portions, regions, elasticity, elastic recovery etc.). The term "at least two types of cables" as used herein relates to at least two types of cables for the same intended use or similar intended uses, by way of example. Two such exemplary types of cables include the coaxial cable 'Dacar® 302-3' (type RTK031) from Leoni® and the 'Cospeed® 5044/1' (type RTK044 (different specification)) from Gebauer & Griller®, of which there are also two embodiments, one with and one without a shielding film. The first has a softer dielectric than the second and the second has a greater outer diameter than the first in the region of the shielding conductor or the protective sheath.

The crimp mounting of the connecting device at/on the corresponding type of cable according to the above-described embodiments may be carried out in a single crimping machine, a single automatic crimper or a crimping installation. A crimping dimension for a crimping press of the crimping machine, the automatic crimper or the crimping installation that corresponds to the impedance target range is chosen appropriately for the created, at least partially pre-assembled cable. These crimps, for example crimp sleeves, can also be established manually.

The impedance set in the target range depends on a number of factors, which are in particular specified by a user, for example a customer, and its intended application for the connecting device. For example, a return loss is such a factor. With the aid of time domain reflectometry measurements (TDR: Time Domain Reflectometry), a specimen cable crimped with the connecting device is tested and used for determining a profile of the variation in the impedance of the specimen cable over time (t). The time correlates with a length of the specimen cable, wherein a crimping region is identifiable in the impedance profile and consequently a corresponding impedance can be read off. This operation is repeated for each specimen cable crimped with different crimping dimensions.

The crimping dimension that correlates with a desired impedance (Im), for example crimping height, may be determined according to the invention on the basis of laboratory measurements of specimen cables with different crimping dimensions. Thus, the profiles of the variation in the impedance of three-part coaxial connecting devices respectively crimped on cables can be determined in the region of their ferrules. A specific type of cable (e.g., FIG. 1: cable type 1, FIG. 2: cable type 2) is then pre-assembled with the same type (FIGS. 1 and 2) of a coaxial connecting device, wherein the shielding contact sleeves of the coaxial connecting devices have been crimped with different crimping dimensions, which again correlate with crimping sizes of the pre-assembled cable in the region of their coaxial connecting devices.

The crimping dimension chosen for the crimping tool may be a crimping diameter, a crimping height and/or a crimping width of a preferably closed crimping tool. The crimping "height" is the direction in which a part, in particular a crimp indentor, of the crimping tool is movable. The crimping "width" is arranged substantially perpendicular to this height. Another crimping dimension can be set can by at least one additional means or device on/in the crimp indentor and/or a crimp anvil, which establishes a secondary dimension for the crimp beyond a main dimension. This allows different forms or diameters of crimps to be established according to a form of the open/closed crimping tool. In the case of cables with also a coaxial arrangement of their conductors, these are usually substantially circular, substantially elliptical or substantially oval crimping cross sections of the connecting device.

The crimping dimension for the crimping tool may also be chosen in dependence on a construction, in particular a geometry, a cross-section and/or a material distribution of the connecting device. Thus, for example, a falling impedance may be achieved by means of a reduction of an inductive component, or by means of an increase of the capacitive component of the connecting device, or vice versa. A material of the dielectric of the connecting device and air gaps in the connecting device influence a capacitance of the connecting device, as the permittivity of the dielectric and/or the air are related to a corresponding capacitance of the connecting device, wherein higher permittivities lower the impedance.

Furthermore, the crimping dimension of the crimping tool may be chosen on the basis of a temporally anterior crimping size of a crimp of this connecting device. This crimping size correlates with a crimping dimension of a corresponding crimping tool. In addition, the crimping dimension for the crimping tool may be chosen on the basis of a later condition for use and/or requirement of the overall connecting device and/or the pre-assembled cable.

In the case of a connecting device which is crimped several times, the above-described methods may be performed in such a way that the impedance is substantially set in the target corridor by means of a final crimping step. Such a connecting device to be crimped several times may be a coaxial connecting device or a twinaxial connecting device. A crimping size of a crimp or a crimping dimension for a temporally anterior crimp may be the same for all types of cables, or a respectively specific setting for the selected type of cable.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A method for crimp mounting a high-frequency (HF) electrical crimp connecting device to an electrical cable, the method comprising steps of:

exposing a shielding conductor of the cable;

crimping a ferrule into a mounting state;

arranging the ferrule in the mounting state over the shielding conductor of the cable;

crimping a terminal of the connecting device onto an inner conductor of the cable;

crimping a shielding contact sleeve over the ferrule, the shielding contact sleeve extending in an axial direction to a protective sheath of the cable; and setting an impedance of the cable within a target impedance range by a selection of at least one of a dimension of at least one crimping tool configured to perform one of the crimping steps, or a dimension of at least one of crimps from one of the crimping steps performed by the at least one crimping tool.

2. The method of claim 1, further comprising the step of reducing a diameter of the ferrule over the shielding conductor until the impedance of the cable is within the target impedance range.

3. The method of claim 1, wherein the crimping the ferrule includes deforming the ferrule only elastically.

4. The method of claim 1, wherein the setting the impedance of the cable within the target impedance range is set by a crimping dimension of the at least one crimping tool.

5. The method of claim 4, wherein the setting the impedance of the cable within the target impedance range is set by the crimping dimension of the crimping tool used to crimp the shielding contact sleeve.

6. The method of claim 1, wherein, during the crimping the shielding contact sleeve, a diameter of the ferrule within the shielding contact sleeve is reduced to achieve the target impedance range.

7. The method of claim 1, wherein the selection of the one of more crimping tools is dependent on least one of a crimping diameter, a crimping height or a crimping width of the crimping tool in a closed position.

8. The method of claim 1, wherein the setting the impedance of the cable within the target impedance range is set by a crimping dimension of a crimping tool used to crimp the terminal.

9. The method of claim 1, wherein the setting the impedance of the cable within the target impedance range is set by a crimping dimension of a crimping tool used to crimp the ferrule.

10. The method of claim 1, further comprising overlapping a free longitudinal end of the shielding conductor over at least a portion of the ferrule after the ferrule has been crimped onto the shielding conductor, wherein the crimping the shielding contact sleeve includes crimping the shielding contact sleeve onto the shielding conductor.

11. The method of claim 10, wherein in the crimping the shielding contact sleeve, the ferrule applies a radially-outward force on the overlapping portion of the shielding conductor.

12. A method for crimp mounting a high-frequency (HF) electrical crimp connecting device to an electrical cable, the method comprising steps of:

exposing a shielding conductor of the cable;

crimping a ferrule into a mounting state, including overlapping free ends of the ferrule and fixing the overlapped ends together in a locked state via at least one fixing hook, a diameter of the ferrule cannot be increased once placed in the locked state;

arranging the ferrule in the mounting state over the shielding conductor of the cable;

crimping a terminal of the connecting device onto an inner conductor of the cable;

crimping a shielding contact sleeve over the ferrule; and setting an impedance of the cable within a target impedance range by a selection of at least one of a dimension of at least one crimping tool configured to perform one of the crimping steps, or a dimension of at least one of crimps from one of the crimping steps performed by the at least one crimping tool.

13. The method of claim 12, wherein, during the crimping the shielding contact sleeve, the ferrule is released from the locked state.

14. The method of claim 12, wherein, in the locked state, the free ends of the ferrule are rotatable relative to one another in only one circumferential direction.

15. A method for crimp mounting a high-frequency (HF) electrical crimp connecting device to an electrical cable, the method comprising steps of:

crimping a ferrule into an initial mounting state, including overlapping free ends of the ferrule and fixing the overlapped ends together in a locked state via at least one fixing hook;

arranging the ferrule over the cable;

crimping a shielding contact sleeve over the ferrule, during the step of crimping the shielding contact sleeve, the ferrule is released from its locked state; and setting a target impedance range of the cable by biasing the ferrule into a compressed mounting state on the cable, the target impedance range of the cable is set according to at least one predetermined dimension of the ferrule in the compressed mounting state.

16. The method of claim 15, wherein, during the step of crimping the shielding contact sleeve, the ferrule is reduced in diameter.

17. A method for crimp mounting a high-frequency (HF) electrical crimp connecting device to an electrical cable, the method comprising steps of:

exposing a shielding conductor of the cable;

crimping a ferrule into a mounting state;

arranging the ferrule in the mounting state over the shielding conductor of the cable;

overlapping a free longitudinal end of the shielding conductor over at least a portion of the ferrule after the ferrule has been arranged over the shielding conductor;

crimping a terminal of the connecting device onto an inner conductor of the cable;

crimping a shielding contact sleeve over the ferrule, including crimping the shielding contact sleeve onto the shielding conductor; and setting an impedance of the cable within a target impedance range by a selection of at least one of a dimension of at least one crimping tool configured to perform one of the crimping steps, or a dimension of at least one of crimps from one of the crimping steps performed by the at least one crimping tool.

* * * * *